United States Patent

Sannerhaugen et al.

[11] Patent Number: 5,942,750
[45] Date of Patent: Aug. 24, 1999

[54] METHOD AND DEVICE FOR CONTINUOUS MONITORING OF DYNAMIC LOADS

[75] Inventors: Vidar Sannerhaugen, Eidsvoll; Sten Hellvik, Kristiansand, both of Norway

[73] Assignee: Safety-One AS, Kristiansand, Norway

[21] Appl. No.: 08/849,951

[22] PCT Filed: Dec. 15, 1995

[86] PCT No.: PCT/NO95/00234

§ 371 Date: Sep. 16, 1997

§ 102(e) Date: Sep. 16, 1997

[87] PCT Pub. No.: WO96/18866

PCT Pub. Date: Jun. 20, 1996

[30] Foreign Application Priority Data

Dec. 16, 1994 [NO] Norway ................................. 94 4899

[51] Int. Cl.⁶ ................................................. H01J 5/16
[52] U.S. Cl. ........................ 250/227.14; 356/32; 340/555
[58] Field of Search ........................ 250/227.14, 227.18,
250/227.17, 227.15, 227.16; 356/32–35;
340/555–557

[56] References Cited

U.S. PATENT DOCUMENTS

| | | | |
|---|---|---|---|
| 4,564,289 | 1/1986 | Spillman, Jr. | 356/33 |
| 4,781,056 | 11/1988 | Noel et al. | 73/18 B |
| 4,900,920 | 2/1990 | Federmann et al. | 250/227.17 |
| 4,900,922 | 2/1990 | Federmann et al. | 250/227.17 |
| 4,928,004 | 5/1990 | Zimmermann et al. | 250/227.14 |
| 4,972,073 | 11/1990 | Lessing | 250/227.16 |
| 5,038,618 | 8/1991 | Malvern | 73/800 |
| 5,054,922 | 10/1991 | Kersey | 356/345 |
| 5,064,270 | 11/1991 | Turpin et al. | 250/227.17 |
| 5,693,936 | 12/1997 | Komachiya et al. | 250/227.17 |

FOREIGN PATENT DOCUMENTS

| | | |
|---|---|---|
| 0 129 972 | 1/1985 | European Pat. Off. . |
| 0 214 907 | 3/1987 | European Pat. Off. . |
| 0 564 366 | 10/1993 | European Pat. Off. . |
| 0 573 778 | 12/1993 | European Pat. Off. . |
| 61-47513 | 3/1986 | Japan . |

*Primary Examiner*—Que T. Le
*Attorney, Agent, or Firm*—Jacobson, Price, Holman & Stern, PLLC

[57] ABSTRACT

For continuous monitoring of dynamic loads, including stresses and strains in large hull structures for vessels (5), a strain measurement system (2) is employed with fiber optic cables which connect optical strain sensors (7; 16) at different points in the hull structure. Optical signals for detection of stresses and strains are distributed to the strain sensors (7; 16) from an optical transmitter (11). The strain measurement system (2) is connected via a central monitoring unit (10) to a computer-implemented control system (1) which in turn is connected to a display and data presentation unit (4) and possibly other measurement systems (3). In a first operating mode, strain values during loading and unloading of the vessel (5) are detected by the strain sensors (7; 16). The control system (1) generates a curve which shows an average strain, and an alarm signal if the average strain exceeds a predetermined threshold which indicates an unacceptable level of strain. In a second operating mode, when the vessel (5) is underway, strains are continuously detected by the strain sensors (7; 16). An alarm signal is generated if the average strain exceeds a predetermined threshold which indicates an unacceptable level of strain. A strain measurement system and a fiber optic strain sensor (16) are also used with this method.

27 Claims, 10 Drawing Sheets

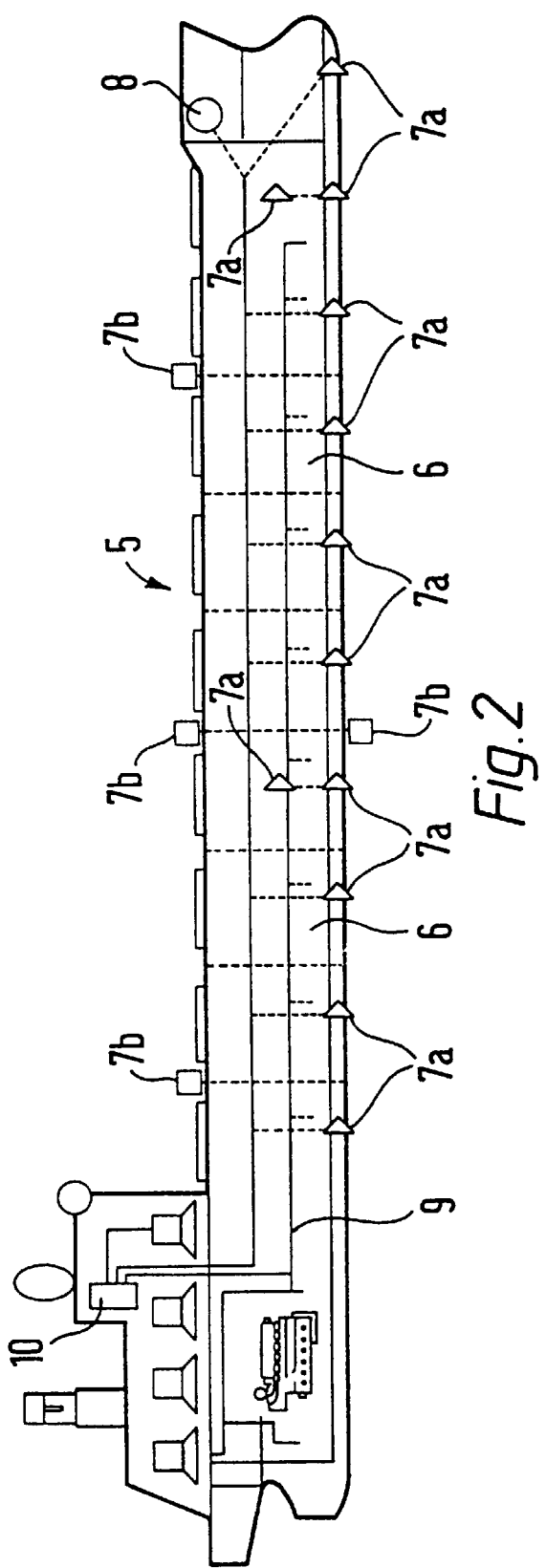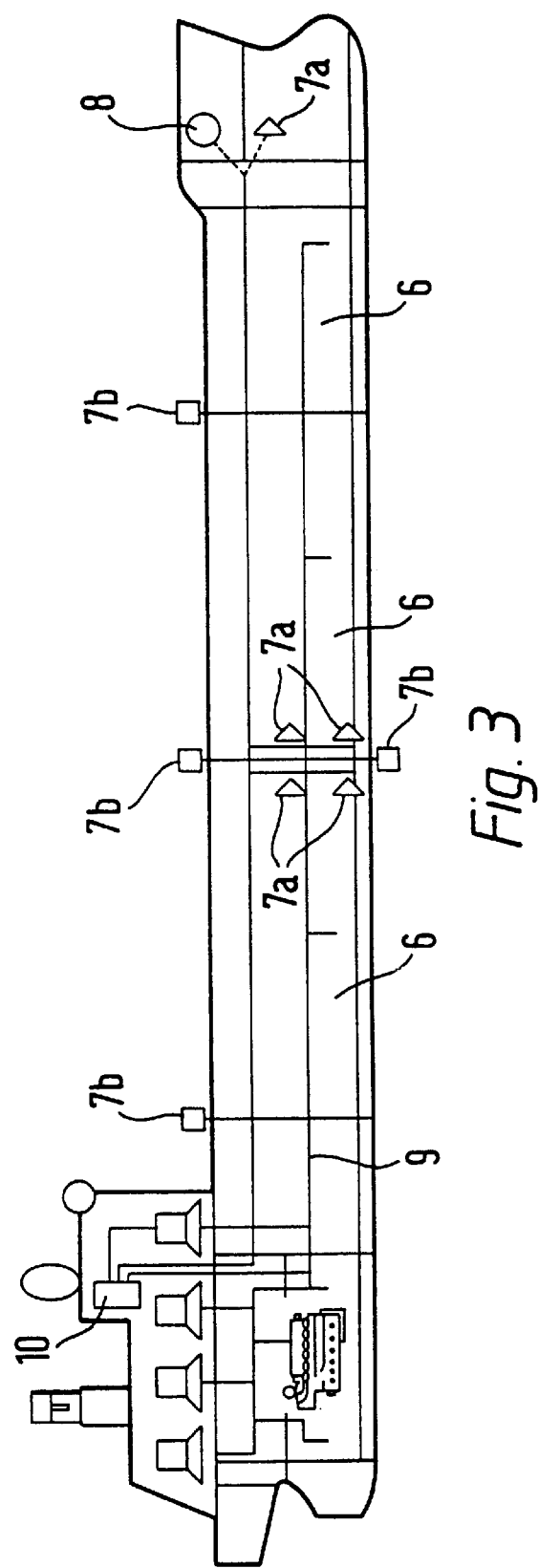

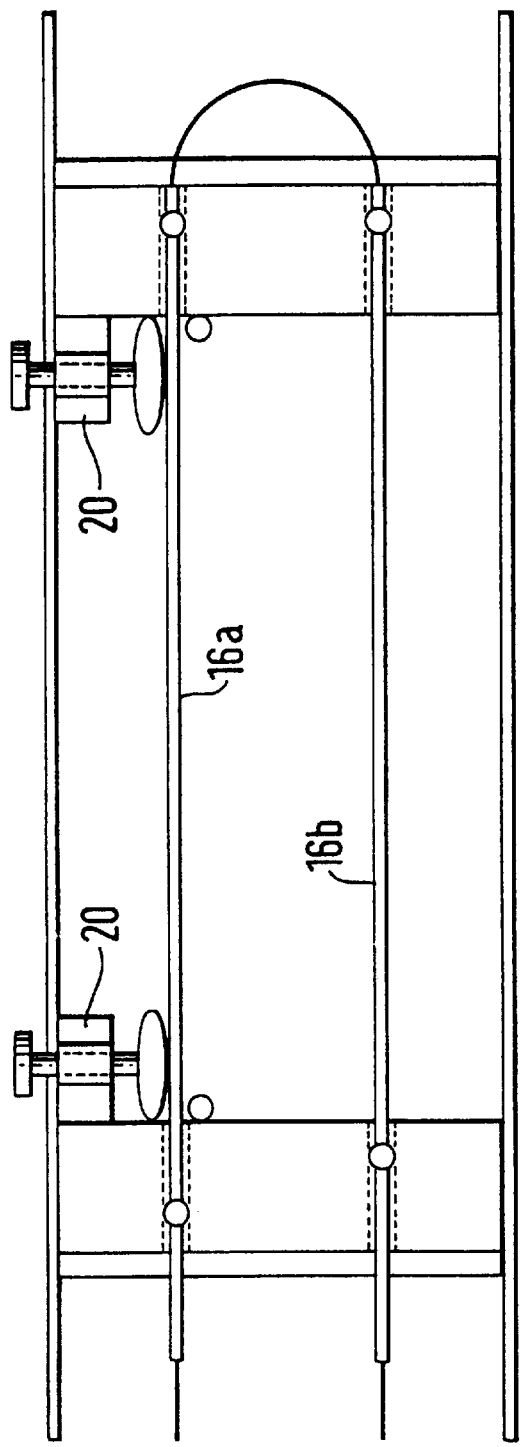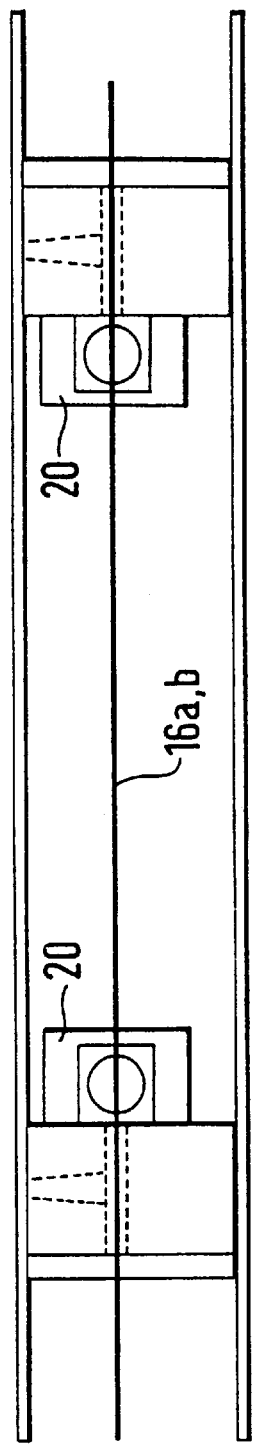
Fig.10(a)
Fig.10(b)

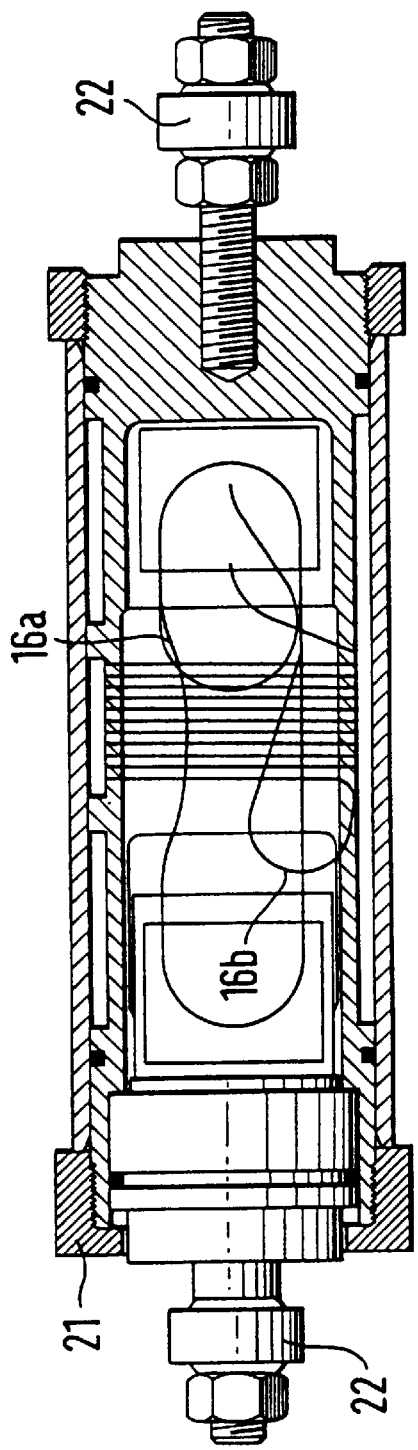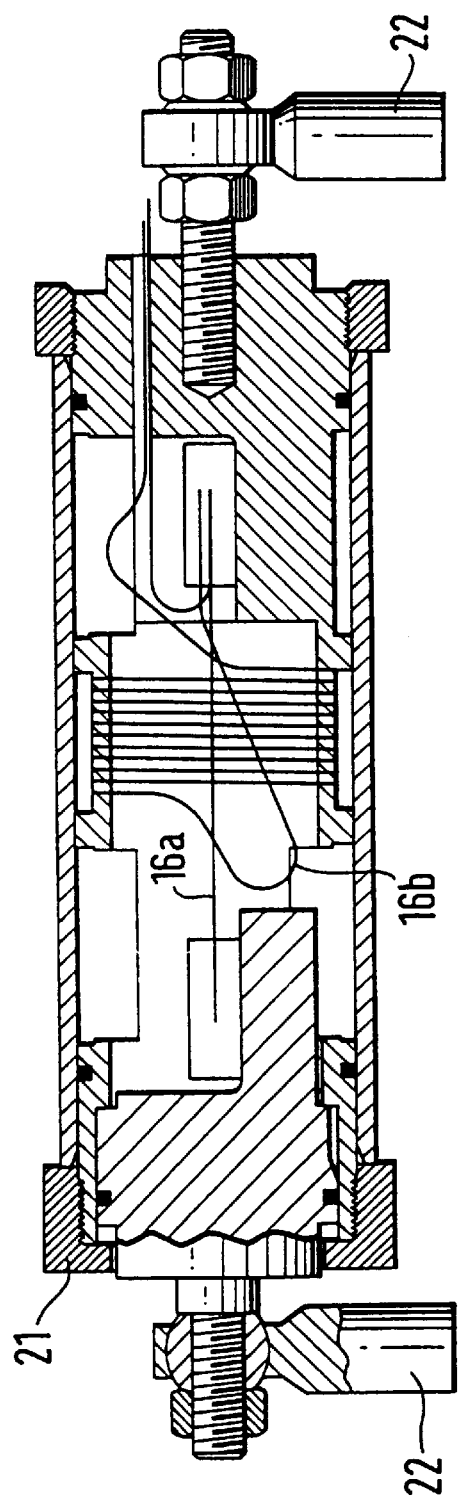

METHOD AND DEVICE FOR CONTINUOUS MONITORING OF DYNAMIC LOADS

BACKGROUND OF THE INVENTION

1. Field of the Invention

The invention concerns a method for continuous monitoring of dynamic loads, including stresses and strains in large hull structures for vessels, according to the introduction to claim 1. The invention also concerns a strain measurement system for implementing the method, comprising an optical transmitter unit, an optical receiver unit and a fiber optic cable network, wherein the transmitter unit and the receiver unit are provided in a central monitoring unit which is connected via an interface with a computer-implemented control system which in turn is connected to a display and data presentation unit and possibly other measurement systems. Finally, the invention also concerns a temperature-compensated, polarimetric, fiber optic strain sensor for use in a strain measurement system.

2. Description of the Related Art

It is a well known fact that large hull structures, such as both ship and aircraft hulls, are frequently exposed to substantial, dynamic loads. These loads can result in damage to the hull and lead to fatigue and fracture, often with disastrous consequences. Load damage to hull structures normally only becomes apparent in connection with a regular service and inspection carried out by the application of various non-destructive test methods. The problem is that load damage to a hull structure can occur when the vessel is underway and develop with disastrous consequences before it can be discovered in the normal inspection.

From British patent application GP 2238112 (U.S. Pat. No. 5,038,618) a method is known for detection and monitoring of strains in large, technical structures by means of fiber optic cables which are attached to the structure. An optical signal is transferred along the cable to an optical receiver. By analysing the optical signal any changes with regard to length and/or changes in the length of the cable can be shown. The change in the cable length is found by determining phase changes on one or more modulation frequencies, by means of interferometry or pulse time measurement. By means of this method a ship's hull or the like can be monitored in order to indicate strains, but bending or twisting in various beam-like structures can also be revealed.

The method according to this patent publication substantially only provides the opportunity of monitoring global strains, i.e. the relative strains between two points which form the respective end points of the fiber optic detection cable. Even though the awareness of global strains is naturally important in large, dynamically-loaded structures, a more localized strain monitoring is required in order to be able to follow the development of the progress of stress or strain and not least at those individual points in a structure which in all probability will be more vulnerable to strain than other points, and a local strain monitoring will therefore be essential in order to maintain safety. At the same time data from a number of local strain sensors, possibly in connection with one or more global strain sensors and a system which records the forces to which the structure in its entirety is exposed, can be employed in order to provide a complete strain history for the structure, and this can be done with high resolution both in the temporal and spatial domains.

This, however, is based on the assumption that the strain system fulfils specific technical requirements which as yet have not been easy to implement in known, fiber optic strain measurement systems, whether they are based on phase change, interferometry or pulse time measurement. Problems with regard to accuracy and resolution become particularly critical if advantageous data from a large number of local sensors arranged in a very large structure, such as, e.g., a large bulk carrier or a tanker, have to be collected and transferred to a central monitoring unit in real time.

SUMMARY OF THE INVENTION

A principal object of the present invention therefore is to provide a method and a technology which eliminate the disadvantages of the known strain measurement systems and which permit continuous monitoring of forces which affect, for example, a ship's hull during loading, unloading and when underway. Thus it is a first object of the present invention to be able to monitor movements in frames and hull. During loading, unloading and when underway the ship's hull structure will be exposed to different forces and stresses and these will be dependent on the effect which impacts and shocks during loading and unloading have on the ship's structure, and whether a uniform load profile is maintained during loading and unloading. This in turn depends on whether the individual cargo holds are loaded or unloaded according to a fixed plan. Movement in frames and hull will further be dependent on the weather conditions when the ship is underway and whether the cargo shifts.

A second object of the present invention is to monitor vibrations which occur in the ship's hull or the like due to, e.g., engine vibrations, vibrations as a result of impact during loading and unloading, vibrations as a result of heavy seas when underway and general shock effects. It will be of special interest to be able to determine the general vibration spectrum in order, amongst other reasons, to avoid resonances in the hull structure, since such resonances may well lead to permanent damage to the structure.

A third object according to the present invention is to be able to record any shock effects which may, amongst other things, be due to blows from equipment during loading and unloading, shifting of the cargo in rough seas or the impact of waves on the ship's side.

A fourth object of the present invention is to be able to record twisting along the ship's longitudinal axis during operation. In heavy seas the ship's hull can experience substantial twisting, while there is little knowledge as to whether twisting is a problem during loading or unloading.

A fifth object of the present invention is to be able to monitor stresses and strains caused by temperature gradients in the hull during normal service. Ships' plates can be exposed to substantial tensile stresses due to temperature gradients and it is well known that the elasticity of steel is linked to the temperature.

Finally a sixth object of the present invention is to be able to record strains which are due to the formation of cracks, since these can affect the hull's rigidity and lead to changes in the stress diagrams. Such cracks can occur along hatches and coamings in cargo ships, while crack formation along the frames has been shown to be particularly dangerous. These in turn can lead to a reduction in the hull's rigidity along the side and, combined with lack of maintenance, damage incurred during loading and shifting of cargo, could result in parts of the ship's side being smashed in and the ship being wrecked. Maintenance of the ship is an important factor in this connection.

The above-mentioned and other objects are achieved with a method which is characterized by features which are presented in claims 1–8, a strain measurement system which is characterized by the features which are presented in claims 9–18, and a temperature-compensated, polarimetric, fiber optic strain sensor which is characterized by the features which are presented in claims 18–21.

The invention will now be explained in more detail in connection with embodiments of the method, the strain measurement system and the fiber optic strain sensor according to the invention, with reference to the attached drawings.

BRIEF DESCRIPTION OF THE DRAWINGS

FIG. 2 illustrates the strain measurement system in FIG. 1 installed in a bulk carrier.

FIG. 3 illustrates the strain measurement system in FIG. 1 installed in a tanker.

FIG. 10a illustrates the strain sensor viewed from above.

FIG. 10b illustrates the strain sensor viewed from the side.

FIG. 12a is a section through the strain sensor housing in FIG. 11a.

FIG. 12b is a section through the sensor housing in FIG. 11b.

DETAILED DESCRIPTION OF THE PREFERRED EMBODIMENTS

Figure 1:
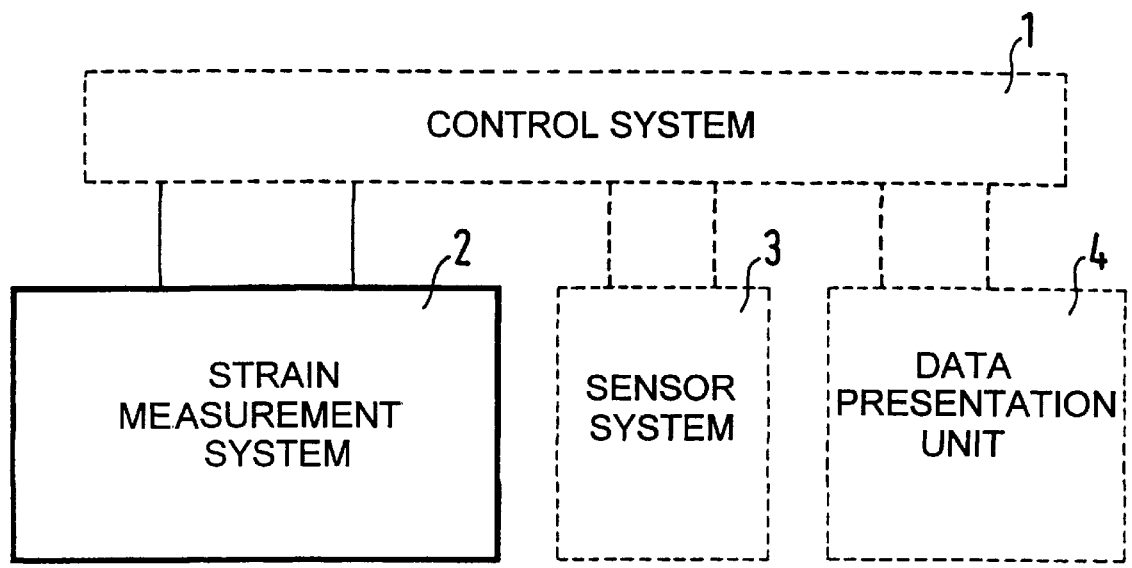
FIG. 1 is a schematic view of the strain measurement system according to the invention.

FIG. 1 illustrates schematically the fiber optic strain measurement system 2, this system being connected to a control system 1 which is implemented in a central computer. The control system is also connected to a central display and data presentation unit 4. In addition the control system can also be connected to other measurement systems or sensor systems 3.

FIG. 2 illustrates how the strain measurement system 2 according to the invention is implemented in a large bulk carrier 5a. A number of strain sensors 7a are provided at specific points in the cargo holds 6, on the decks or on the frames. In addition there are also provided on the ship's hull global longitudinal strain sensors 7b for detection of global strains in the hull's longitudinal axis. In addition there is provided in the ship's bow a triaxial accelerometer 8 which may well be based on the same sensor types which are employed in the other strain sensors. The accelerometer 8 in the bow detects in three axes the accelerations to which the ship is exposed when underway. All the strain sensors 7 are connected via a fiber optic cable network 9 to a central monitoring unit 10 on board the ship, this central unit 10 being simultaneously assigned to the control system 1 implemented on a computer in order to record and process information concerning the dynamic state of the ship's hull.

FIG. 3 illustrates the strain measurement system 2 according to the present invention provided in a tanker 5b, the system being arranged in a similar fashion to the embodiment in FIG. 2.

Figure 4:
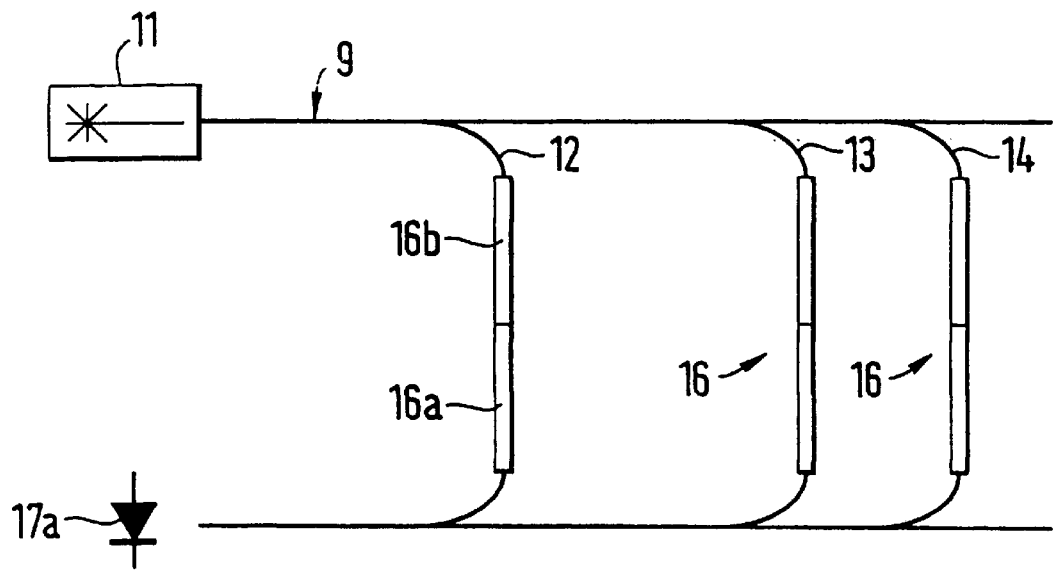
FIG. 4 illustrates the principle of the strain measurement system according to the invention.

FIG. 4 illustrates the principle of the strain measurement system 2 according to the invention. A light source in the form of a laser 11 in the central unit 10 transmits an optical signal through a fiber optic cable network 9 which employs a polarization-maintaining fiber. In branches 12, 13, 14 of this network 9 there are provided optical strain sensors 7 in the form of polarimetric sensors 16. The polarimetric sensor 16 consists of an optical fiber 16b which is mechanically decoupled from the actual hull structure, thus preventing it from being influenced by vibrations, strains or stresses therein, and a corresponding, equally long piece of fiber 16a which is mechanically coupled to the structure and constitutes the strain detecting fiber. The polarization-maintaining fiber is also employed in the sensor fibers. These fiber optic polarimeters 16 are temperature-compensated in that they comprise two spliced, double refractive, optical fibers 16a, 16b of the same type and of the same length. In the splice the fibers are rotated 90°, thus causing the phase shift between the two polarizations formed in the first fiber 16a to be reversed in the second fiber 16b, and thereby ensuring that all perturbations apart from strain are cancelled in the double refractive optical fibers. This in turn means that phase shifts caused by temperature or hydrostatic pressure in turn are cancelled. Since one 16a of the two fibers 16a, 16b in the polarinmeter 16 is connected to the structure, while the other fiber 16b is decoupled from strains in the structure, the strain will be connected to the optical signal which passes through the polarimeter 16, even though the other perturbations are cancelled out. The strain sensor 7 will advantageously employ the linear part of the polarimeter's response. Without external compensation for temperature variations the acceptable linear response range is 30° which in the embodiment can correspond to a relative strain of 2000 $\mu\epsilon$, i.e. 2000 ppm. The output on the polarimetric strain sensors 16 is connected to a through-going fiber in the fiber optic cable network 9 and passed to one or more detectors 17a which are provided in the central unit 10.

Figure 5:
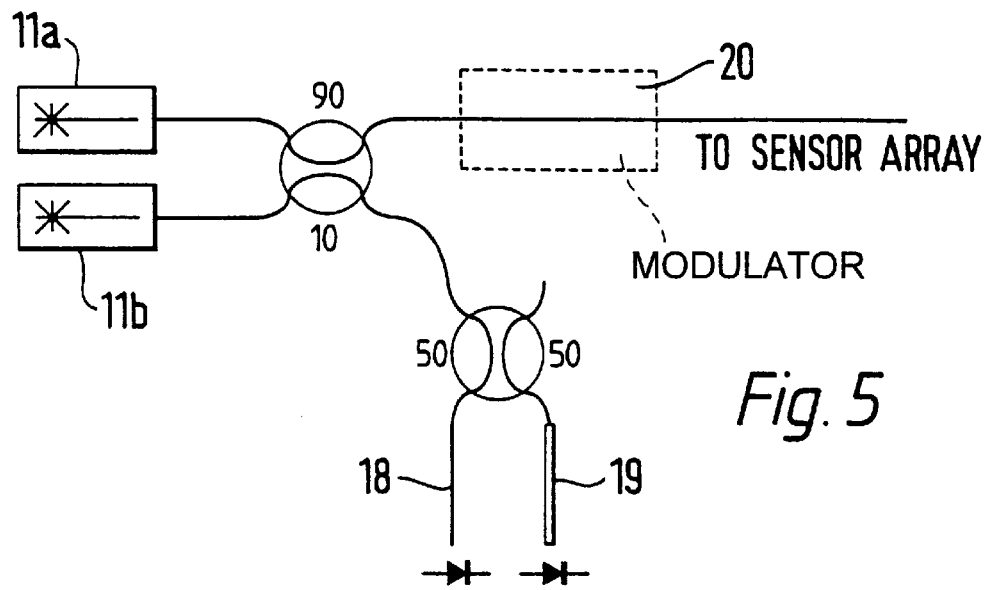
FIG. 5 illustrates the transmitter unit in the strain measurement system according to the invention, with equipment for calibration provided.

A possible design of the transmitter unit 11 for the strain measurement system 2 is illustrated in FIG. 5. This transmitter unit 11 first of all comprises the main laser or the exciting laser 11a as shown in FIG. 4. This constitutes the transmitter laser 11a which supplies the optical signal to the fiber optic cable network 9 in the strain measurement system and preferably employs a high-power, highly stable, diode-pumped Nd; YAG laser. This emits at 1319 nm. The laser 11a can advantageously include an optical insulator (not shown) in order to reduce the sensitivity to feedback light. The laser will be in operation all the time, apart from during any calibration which may be performed.

In order to calibrate the strain measurement system, as illustrated in FIG. 5, an additional laser 11b can be included which emits on an entirely different wavelength from the main or transmitter laser 11a. This reference laser 11b which thus works on a substantially different wavelength from the main laser 11a still lies within the valid wavelength range for the optical fiber which is used in the strain sensors 7; 16. A suitable wavelength for the emission can be 1250 nm. A semiconductor laser with distributed feedback is preferably used as reference laser 11b. The reference laser 11b is connected via an optical coupler (not shown) and an optical fiber to an intensity reference 18 and to a reference polarimeter 19. During calibration, as mentioned, the main laser 11a is switched off, and the reference laser 11b can be used to calibrate the operation of the main laser 11a, including frequency shifts or mode jumps. Mode jumps can lead to errors in the measurement results from the fiber optic strain sensors 7; 16 and the demonstration of errors during the measurements can be used to allow the strain measurement system to generate an error code which is transferred to the control system. In case a time multiplexed detection system is chosen, a high frequency intensity modulator 20 must be included between the main laser 11a and the strain sensors 7;16. The fiber optic network 9 is illustrated in more detail in FIG. 6. The transmitter unit 11 and the receiver unit 17, i.e. the main laser 11a and the optical detectors 17a, are naturally provided as before in the central unit 10. A branch network 9 based either on polarization-maintaining optical fibers or single-polarization fibers runs from the transmitter unit 11. Not shown optical couplers distribute the light to the individual branches 12, 13, 14, 15. The network's topology is of greater importance the greater the number of sensors. If only seven sensors are used, there is little difference between a ladder structure or tree structure with respect to the available optical effect. When the strain sensors 7 are based on polarimetric sensors 16 as in the present embodiment, polarization maintenance will be the most critical parameter in the choice of the optical cable network. The optical couplers too must be polarization-maintaining. If the number of sensors increases, more couplers will also be required, in which case it will be advantageous to use a tree structure and not a ladder structure.

Figure 6:
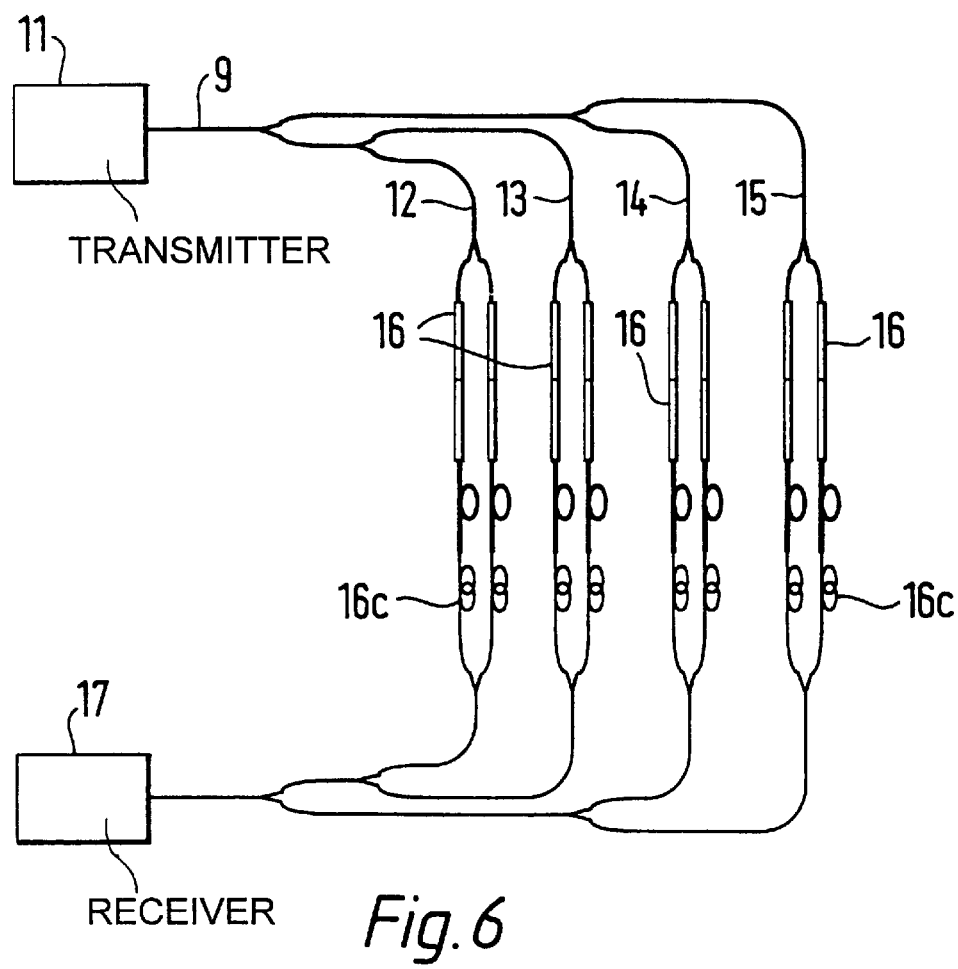
FIG. 6 illustrates the detailed topological layout of the fiber optic cable network in the strain measurement system according to the invention.

At any rate polarization-maintaining couplers and polarization-maintaining optical fibers should be used in a branch network Instead of standard polarization-maintaining fibers, single-polarization fibers can preferably be used and the same type of fiber can be used as a fiber optic polarizer at the output on each polarimetric sensor 16. An optical standard fiber can thereby be used in the data acquisition network which leads from the sensors 16 to the receiver unit 17. If the strain measurement system according to the invention does not employ multiplexing in the acquisition part of the network, this leads to lower costs. In FIG. 6 the sensors 16 are shown with the fiber optic polarizer 16a, 16b and delay loops 16c provided in the actual sensor which is located in a not shown housing. The optical couplers can preferably also be provided in the sensor housing.

Figure 7:
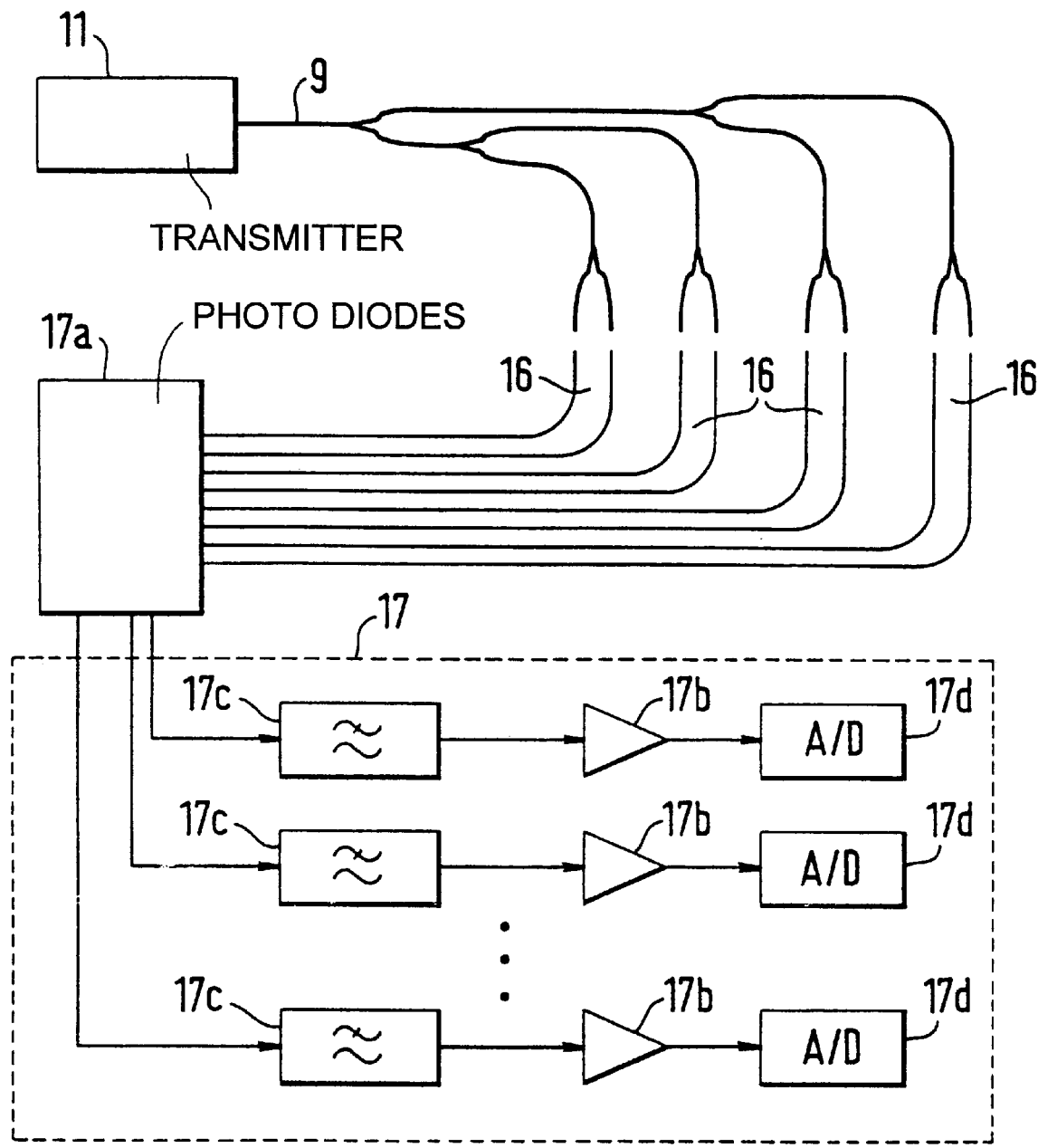
FIG. 7 illustrates the strain measurement system according to the invention without the use of time multiplexing.
Figure 8:
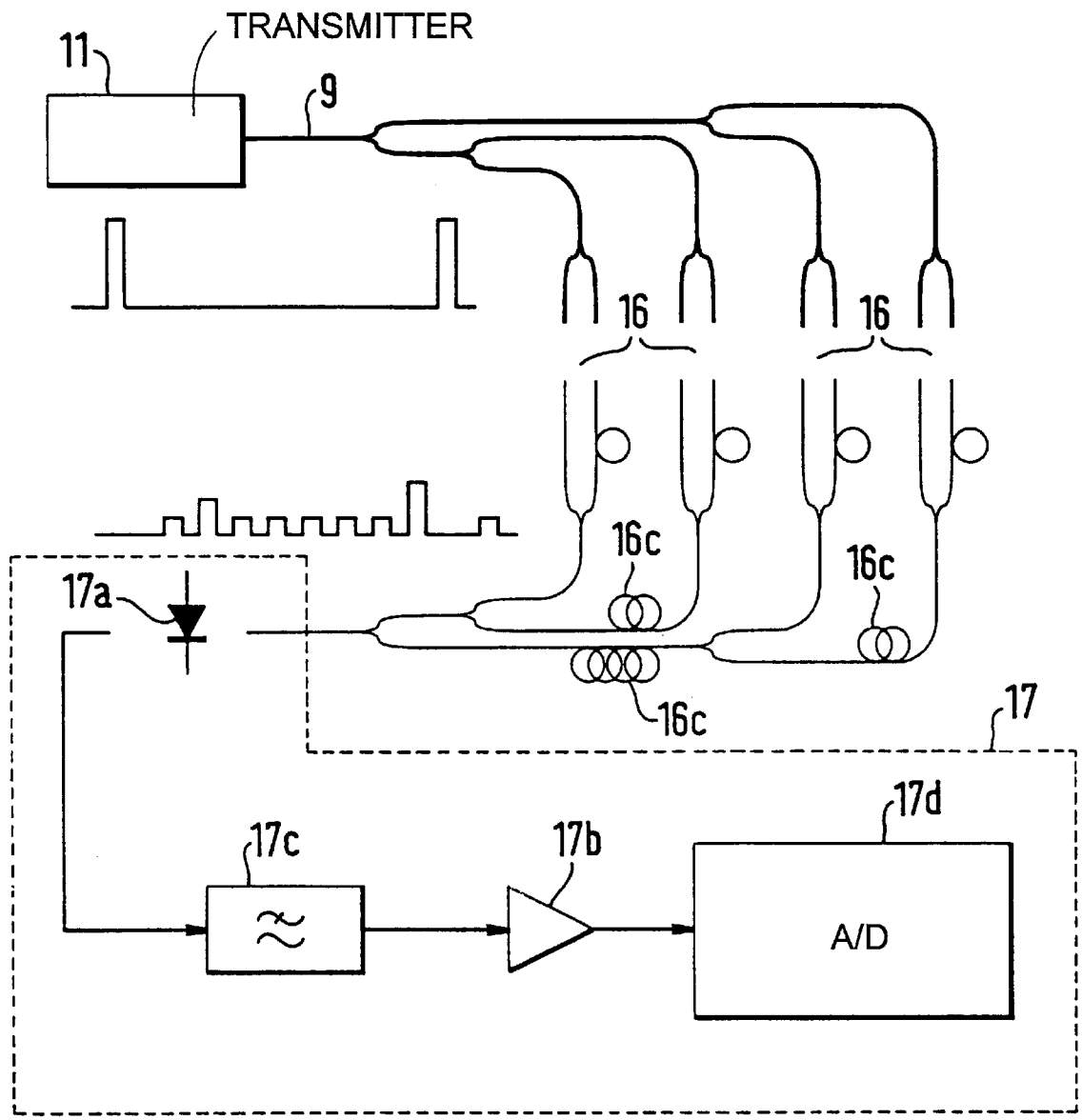
FIG. 8 illustrates the strain measurement system according to the invention with the use of time multiplexing.
Figure 9:
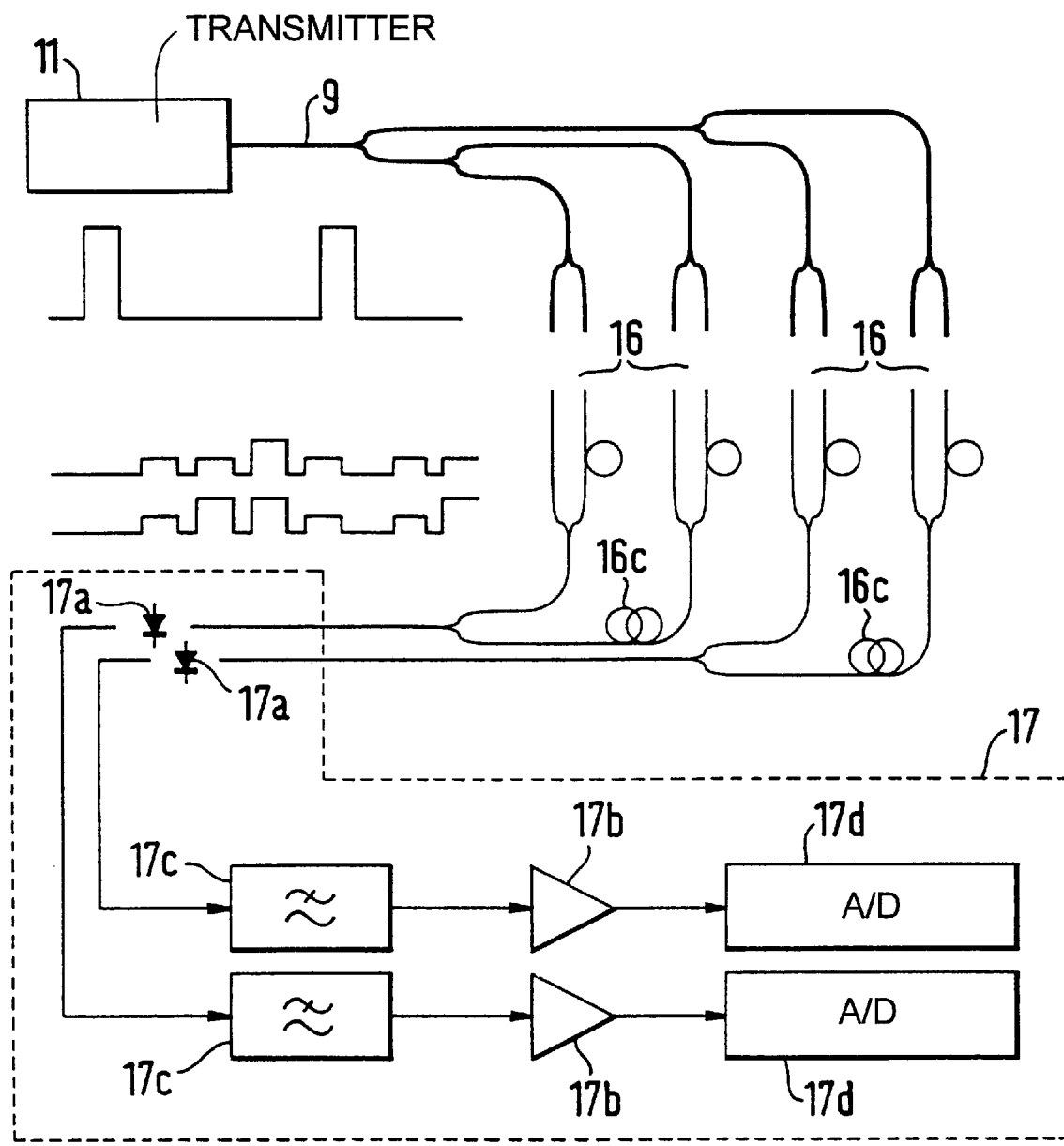
FIG. 9 illustrates the strain measurement system according to the invention with a partially time multiplexed and a partially spatial multiplexed strain sensor system.

The strain measurement system 2 according to the invention can employ a multiplexed or non-multiplexed return network, i.e. the acquisition part of the fiber optic cable network 9, or the system can comprise a partially multiplexed acquisition network. A strain measurement system 2 according to the invention without time multiplexing is illustrated in FIG. 7. The difference with a strain measurement system according to the invention substantially lies in systems with time multiplexing and systems without time multiplexing. An entirely spatial multiplexed system as in FIG. 7 has the advantage that all the optical power can be exploited, even though the noise problems can be greater than in time multiplexed systems. In addition to this many individual receiver channels have to be calibrated and if the number of strain sensors 16 is large, large quantities of optical fiber are required in the cable network, thus incurring high costs. FIG. 8 illustrates the strain measurement system 2 according to the invention based on time multiplexing in the return network. This uses considerably less fiber in the cable network, with the result that a number of different sensor systems can virtually employ one standard cable. A significant advantage with the time multiplexed solution is that all the channels use the same signal processing electronics, thus giving relatively little deviation in the response between the individual sensors. Due to optical power loss with the use of many sensors it can be advantageous to divide the strain measurement system according to the invention between several separate time multiplexed acquisition networks. It may be advantageous to employ a combination of time multiplexing and spatial multiplexing, especially in strain measurement systems with a large number of sensors, as illustrated in FIG. 9. The receiver unit 17 is based on the use of photodiodes 17a, preferably of the PIN type In the receiver 17 it is advantageous to employ a transimpedance amplifier as an operational amplifier 17b.

FIG. 10 illustrates schematically the design of a polarimetric, fiber optic strain sensor 16 according to the invention. The strain detecting fiber 16a is mechanically coupled to the structure via adjustable couplers 20 and on one end of the housing 21 by a 90° splice joined to the mechanically decoupled, optical fiber 16b which otherwise has exactly the same properties as the mechanically coupled optical fiber 16a. The sensor fibers 16a, 16b are placed in a watertight housing 21 which is preferably filled with a viscous liquid so that the fibers' acceleration sensitivity is as low as possible. The sensor fibers 16a, 16b are preferably installed and attached to support plates of metal or of another material which is compatible with the ship's hull material. The strain-sensitive fiber is naturally prestressed through the attachment to the support plates.

Figure 11A:
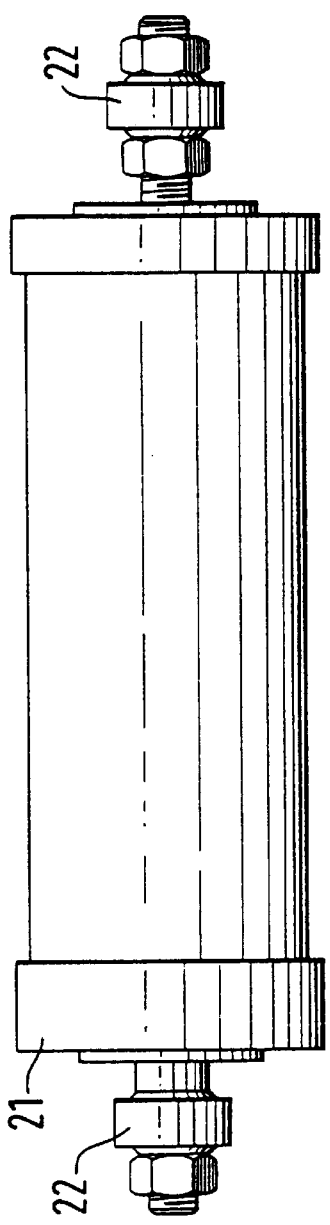
FIG. 11 illustrates a housing for a fiber optic strain sensor according to the invention, in which FIG. 11 (a) illustrates the housing viewed from above, FIG. 11 (b) the housing viewed from the side and FIG. 11 (c) the housing viewed from one end.
Figure 11B:
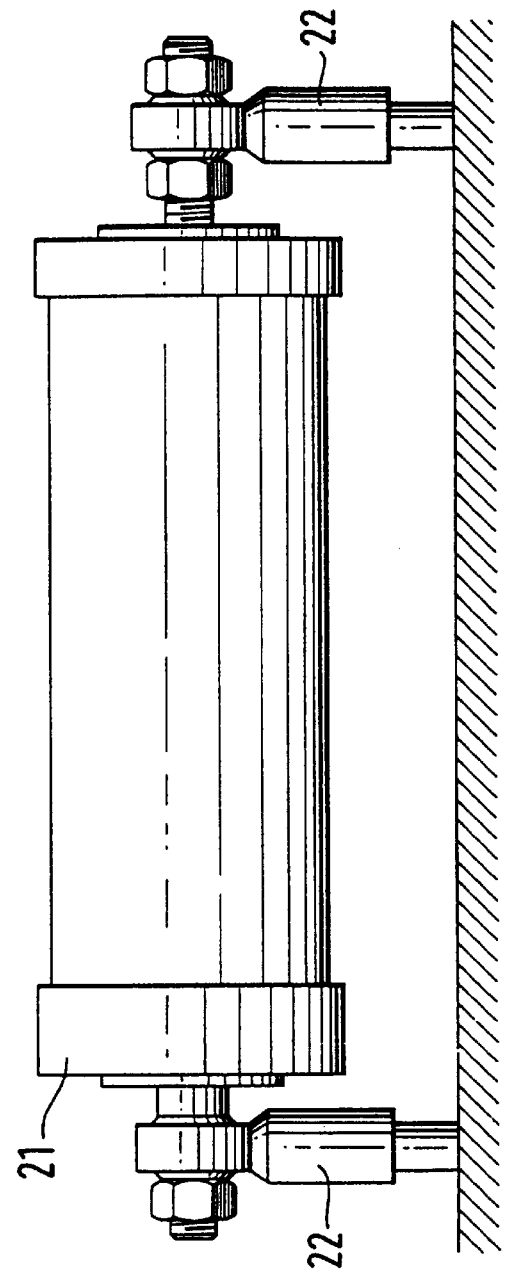
Figure 11C:
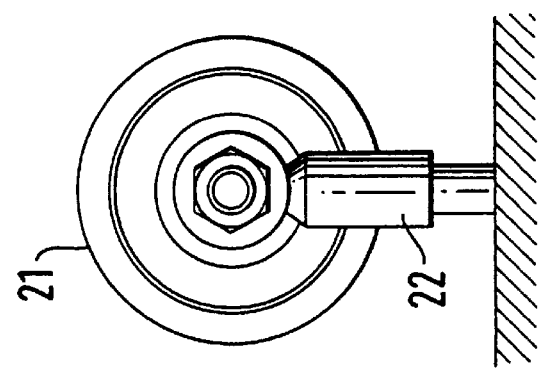

FIG. 11 illustrates a practical embodiment of a sensor housing 21 for the polarimetric strain sensor 16 according to the invention. The sensor housing 21 with the support plates for prestressing of the strain-sensitive fiber is rigidly connected to attachment devices 22 which can be welded or rigidly fastened in some other way to the ship's hull at the measuring point at which the sensor has to be located, thereby ensuring that stresses and strains in the hull are transferred to the sensor.

FIG. 12 shows a section through the sensor housing 21 in FIG. 11, viewed from above and from the side respectively, with the sensor device and the attachment of the sensor fibers illustrated.

It should be understood, however, that even the structural design of the sensor housing and the arrangement of the sensor fibers can be implemented in a number of different ways within the scope of the present invention.

Figure 13A:
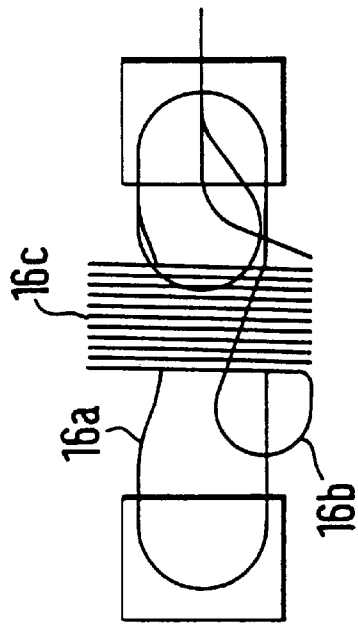
FIGS. 13a,b,c illustrate different methods of arranging the sensor fibers and a delay loop in a strain sensor according to the invention.
Figure 13B:
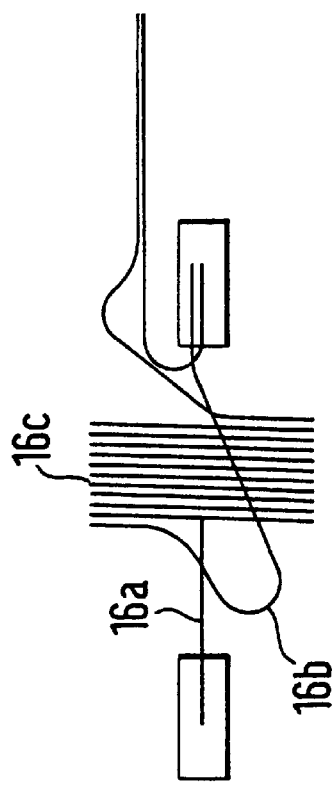
Figure 13C:
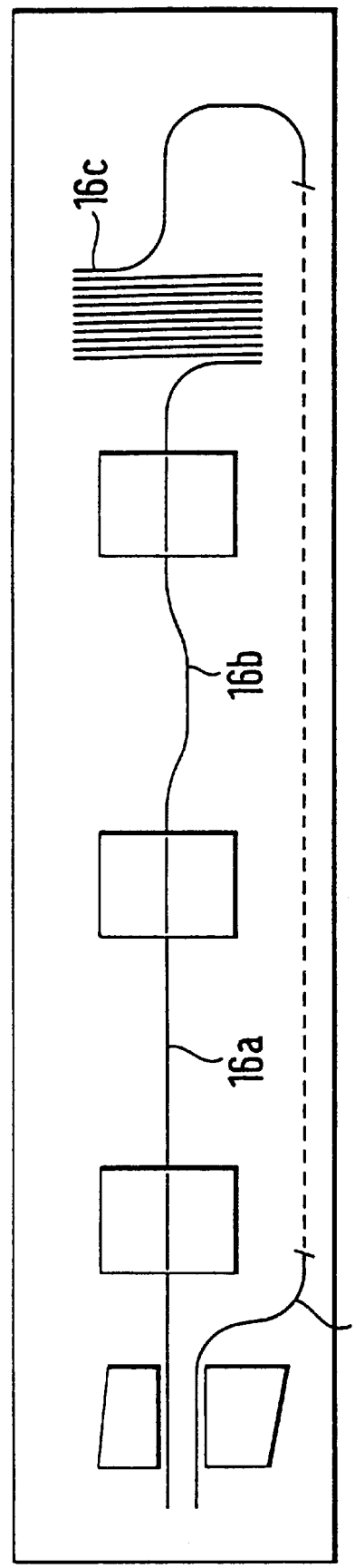

As illustrated in FIGS. 12a and 12b, an embodiment of the polarimetric sensor 16 according to the present invention is based on a mechanical device which permits a purely axial displacement of two elements which are connected with each other by means of strain-detecting 16a and temperature-compensating fibers 16b respectively. The sensor consists of two cylindrical components which form a male main part and a female main part which are fastened via a ball joint device to two bolts 22 which in turn are connected to a structural element in the hull at the measuring point. The elements of the main part can be freely displaced axially away from each other and towards each other as a reaction to a change in the distance between two bolts 22 which provide attachment to the structural element. The elements of the main part are located in a protective casing and attached to each other by means of the fibers as described above. The strain and temperature-compensation fibres 16b, 16a are attached via fiber fastening blocks to the main part elements. Adjustment of the relative distance between the main part and thereby the tension in the strain fiber 16a can be achieved by means of adjustment bolts. The sensor 16 can therefore be adjusted after having been installed, thus obtaining a prestressing which provides a mid-stress response in the strain fiber 16a. After installation and calibration the sensor can thereby measure the axial strain in the structural element, when this element is exposed to various load conditions. The strain is then measured as the distance between the supporting bolts 22 increases or decreases. An increase in the supporting bolt distance increases the strain in the strain fiber, while a reduction in the distance reduces the strain. The actual sensor housing 21 can be filled with a highly viscous fluid or a gel with good heat transfer properties, thus improving the heat stability of the sensor. In addition, as mentioned above, this means that the sensor becomes less sensitive to accelerations. As mentioned, the actual sensor housing 21 is designed as a watertight unit and can therefore be exposed to unfavourable marine environments without a reduction in efficiency or accuracy. In the illustrated example the actual sensor fibers 16 have a length of approximately half a metre, but in addition as illustrated in FIGS. 13a,b,c, a delay loop 16c of several meters can be integrated in the sensor housing between the sensor fibers 16a, 16b and the output fiber.

Basically, the strain measurement system according to the present invention could also have been based on other types of optical strain sensors than the polarimetric sensors here preferred. For example Bragg grating sensors could have been used which in principle are a narrow band reflector, where the center wavelength is altered when the sensor is exposed to strain. A system based on Bragg grating sensors is excited by means of a laser, but both the laser and the grating appear to be most suited to a multiplexed system, which at present is extremely expensive to implement if a large number of sensors require to be used. Systems based on Bragg grating sensors, however, have several advantages with regard to resolution and dynamic range and can employ a standard optical communication fiber. In addition the sensors can be made very small.

A further advantageous design will be a sensor in which the sensor element is rigidly connected to the structural element which is exposed to strains, either directly or indirectly. It will be an advantage if the sensor is designed in a small size.

The strain measurement system according to the present invention could also be envisaged implemented by means of fiber optic interferometers based on ordinary white light. Strains can then be recorded by means of standard Doppler interferometry. However, there is a problem when using fiber optic interferometers that great distances between the measuring points combined with the wish for high resolution greatly reduces the signal/noise ratio. It is an advantage, however, that fiber optic interferometry does not require the use of a polarization-maintaining fiber, thus enabling a standard communication fiber to be employed in the fiber optic cable network The use of fiber optic interferometers in the strain measurement system according to the present invention can therefore be an alternative if the requirement for resolution and dynamic range is a minor consideration and if there should be a wish to reduce the system costs.

The strain measurement system according to the present invention works in two modes, the first operating mode recording strains during loading and unloading and measuring all relevant strains continuously. Via the control system average strain can be displayed simultaneously on the display unit and updated every minute. Should unacceptable strain levels occur during loading and unloading, an alarm signal can be activated. In a second operating mode the strain measurement system according to the invention measures all relevant strains continuously when the vessel is underway. At the same time the display unit displays a curve for average strain which, for example, is updated every five minutes or according to one's choice within an interval of 1–60 minutes. A curve is also displayed simultaneously which shows the strain's standard deviation, and this curve can similarly be updated every five minutes or according to one's choice at intervals of 1–60 minutes. Should an unacceptable level of strain arise, an alarm signal can be activated. On the basis of given predetermined criteria, the control system can simultaneously record the worst strain sequences within a period of for example 20 minutes, i.e. strain sequences in which the strain for example is greatest or exceeds a predetermined threshold. Up to a hundred of these sequences can be stored in the control system. The control system will also be capable of recording statistics for load sequences and make these data available when it is time for service and inspection. Such load sequences can for example be categorised within a range of 50 $\mu\epsilon$ (relative strain in ppm) and shown in histogram form in an operator-defined time interval, for example day, week, month or year.

Thus by means of the method and strain measurement system according to the invention a wholly continuous monitoring is obtained of the loads to which the vessel hull is exposed. For example average strain in the last elapsed minute could be recorded every minute, and statistical parameters as standard deviation, top to top in the same cycle, minimum and maximum top, and the number of dynamic passages through zero over for example the last 5 minutes can be recorded every 5 minutes.

The strain measurement system 2 will therefore be capable of monitoring the absolute strain to which the vessel or ship 5 is exposed. A triaxial accelerometer 8 in the vessel's bow is also included in the total system, and as mentioned this is preferably in the form of a fiber optic sensor which is included in the strain sensor system. The strain measurement system 2 also comprises an uninterrupted power supply (UPS) which enables the system to operate for at least 20 minutes if a power cut occurs. The strain measurement system according to the invention should be able to be coupled to load computers, particularly with a view to calibration purposes. If the system is inadvertently shut down or breaks down, it will start up again automatically and continue recording. The system should also be capable of recalibrating all the strain sensors 7 against a known load state. The strain measurement system according to the present invention is essentially a purely optical system, apart from the system's central monitoring unit. Any extra electronic equipment apart from the central unit or the control system should comply with standard EX regulations and be sea water-resistant.

Between the strain measurement system 2 and the control system 1 there is provided an interface which permits data from each strain sensor 7; 16 for example to be sampled at a frequency of 10 Hz and converted to a digital signal. The data from all the sensors 7; 16 are then transferred sequentially to the control system's computer in real time and in accordance with a predefined protocol. If the data from the strain sensors 7; 16 are not reliable, a separate digital line goes to low, acting as a validity check. An interface between the control system and the strain measurement system 2 is used to signal that the system should be switched on or off or to give a command for calibration of the system.

The actual control system 1 handles the sampled data and decides which events should be stored. The control system 1 includes a real time clock and an uninterrupted power supply, thus giving all the data recording a correct time indication, while at the same time any break-down of the system is detected and recorded. The uninterrupted power supply must be able to run the real time clock until the ordinary power supply returns. The control system 1 will also monitor all incoming data in order to detect errors in the individual strain sensors.

The strain measurement system 2 according to the invention is designed for a resolution in each sensor element of 5 $\mu\epsilon$ or right down to 2 $\mu\epsilon$, while the dynamic range for each sensor element should be a minimum of 2000 $\mu\epsilon$. Furthermore the strain measurement system 2 can handle fiber optic cable lengths of up to 600 meters and at least 7 independent strain sensors and preferably up to 25 independent strain sensors. Furthermore the strain measurement system according to the present invention can record accelerations of at least 2 G with a cross sensitivity of less than 20 $\mu\epsilon$/G in all three axial directions. The strain measurement system according to the present invention should also be able to work correctly up to a minimum of 5 bar and with a cross sensitivity of not less than 40 $\mu\epsilon$/bar. If an error condition arises, the aim of the strain measurement system according to the present invention is that it should be capable of correcting itself and supplying correct data in the course of 5 seconds. The error condition is reported to the control system 1 and it is a precondition that such error conditions should not occur more than 5 times during one hour's operation. The aim is that the system according to the invention should not be out of operation for more than 5 seconds per day. It is naturally assumed that the system's specifications should be capable of continuous further improvement in order to keep pace with the relevant technical development.

It should be understood that the method and the strain measurement system according to the present invention are not exclusively restricted to large hull structures for ships such a bulk carriers and tankers, but that they can naturally be employed on other types of ship, offshore structures or for that matter on aircraft and spaceships, as well as land-based vehicles or generally speaking any large structures which are continuously exposed to dynamic loads.

By means of the strain measurement system according to the present invention load sequences and strain data can be transferred from the ship to a land-based, central data recording system, and the transfer can, e.g., be performed via satellite. The land-based system can comprise a large data base which can store the load and strain history of the vessel or the monitored object through a number of years and thereby manifest long-term tendencies with regard to the stresses and strains to which the vessel or ship is exposed. These data can then be used to evaluate the need for repair, replacement or improvements and finally also for estimating the life span of the vessel.

We claim:

1. A method for continuous monitoring of dynamic loads, including stresses and strains in large hull structures for vessels, especially in steel hulls of bulk carriers and tankers, wherein there is employed a strain measurement system with fiber optic cables which connect optical strain sensors on various points in the hull structures, wherein optical signals for detection of stresses and strains are distributed to the strain sensors from an optical transmitter and after passing through the strain sensors are detected by one or more optical detectors, wherein the optical transmitter and the optical detectors are provided in a central monitoring unit, and wherein the strain measurement system is connected via the central monitoring unit to a computer-implemented control system which in turn is connected to a display and data presentation unit and further possible measurement systems, characterized in that a first operating mode, during loading and unloading of the vessel, the method comprises the steps of continuously detecting strain values by means of the strain sensors, generating by means of the control system a curve which shows an average strain, updating the curve at a predetermined time interval, displaying the generated curve on the display unit, and generating an alarm signal if the average strain exceeds a predetermined threshold which indicates an unacceptable level of strain, and that in a second operating mode when the vessel is underway, the method comprises the steps of detecting strains continuously by means of the strain sensors, generating by means of the control system a curve which shows average strain and a curve which shows the strain's standard deviation respectively, updating the said curves at a predetermined time interval, displaying the generated curves on the display unit and generating an alarm signal if the average strain exceeds a predetermined threshold which indicates an unacceptable level of strain.

2. The method according to claim 1, characterized by recording in the control system the strain sequence which during a predetermined time interval show the highest average strain values, especially the strain sequences during which the average strain values in the time interval exceed the predetermined threshold, or those strain sequences which are obtained on the basis of a given predetermined criteria.

3. The method according to claim 2, characterized by generating and recording statistical data for load sequences on the basis of the recorded strain sequences, the statistical data being made accessible in accordance with fixed service intervals.

4. The method according to claim 3, characterized in that the load sequences are categorized in a relative strain range of 50 $\mu\epsilon$ where $\mu\epsilon$ constitutes 1 ppm, and is shown in histogram form in an operator-defined time interval, for example day/week/month/year.

5. The method according to claim 1, characterized in that the detected strain values are sampled at a predetermined frequency and converted to digital data.

6. The method according to claim 5, characterized in that the digital data are transferred sequentially to the computer implemented control system according to a predetermined protocol, the data transfer taking place in real time.

7. The method according to claim 1, characterized in that the curve for average strain in the first operating mode is updated at an interval of one minute.

8. The method according to claim 1, characterized in that the curve for average strain in the second operating mode is updated at an interval of 1–60 minutes, preferably every five minutes.

9. The strain measurement system for implementation of the method according to claim 1, comprising an optical transmitter unit, an optical receiver unit and a fiber optical cable network, wherein the transmitter unit and the receiver unit are provided in a central monitoring unit which is connected via an interface to a computer-implemented control system which in turn is connected to a display and data presentation unit, together with further possible measurement systems, characterized in that the optical transmitter unit comprises at least one first laser which supplies an optical signal to the fiber optic cable network, that the receiver unit comprises an optical detection system with one or more optical detectors, that at a number of desired local measuring points there is provided a respective fiber optic strain sensor, the fiber optic strain sensors each being connected via the fiber optic cable network with the optical transmitter unit and the optical receiver unit, and that in the optic cable network there are also provided several global longitudinal strain sensors.

10. The system according to claim 9, characterized in that the fiber optic cable network is composed of polarization-maintaining optical fibers, that the cable network forms a branched network, polarization-maintaining fiber optic couplers being provided for the branch, and that in each of the branches in the network at a desired measuring point there is provided a fiber optic polarimeter which constitutes the fiber optic strain sensor.

11. The system according to claim 10, characterized in that the detection system is time multiplexed, there being provided on the output of the laser in the transmitter unit and a high frequency optical intensity modulator, and that natural delays are employed in the fiber optic cable network and/or special delays are provided in the network.

12. The system according to claim 10, characterized in that the detection system is a combined time multiplexed and spatial multiplexed system, there being provided on the output from the laser in the transmitter unit a high frequency optical intensity modulator, and that natural delays are employed in the optical cable network, and/or special delays are provided in the network.

13. The system according to claim 10, characterized in that it comprises a triaxial accelerometer provided in the vessel's bow.

14. The system according to claim 13, characterized in that the accelerometer is a polarimetric, fiber optic sensor which is coupled to the fiber optic cable network which connects the other strain sensors.

15. The system according to claim 10, characterized in that the polarization-maintaining optical fibers comprise single-polarization fibers, the fibers being used both in the optical cable network and in the strain sensors.

16. The system according to claim 9, characterized in that the transmitter unit comprises a high-power, highly stable diode-pumped Nd; YAG laser which emits at 319 mm.

17. The system according to claim 10, characterized in that for calibration of the strain system in the transmitter unit there is provided a reference laser, preferably in the form of a semiconductor laser with distributed feedback, optical couplers and an intensity reference and a reference polarimeter, the intensity reference and the reference polarimeter being connected to the reference laser via a polarization-maintaining optical fiber.

18. The system according to claim 9, characterized in that the fiber optic strain sensor is a temperature-compensated, polarimetric strain sensor, that the strain sensor comprises a first, double refractive, polarization-maintaining optical fiber and a second, double refractive, polarization-maintaining optical fiber of the same type and length as the first fiber, that the first optical fiber is mechanically coupled to a measuring point which is exposed to strain, that the second optical fiber is provided decoupled from any mechanical strain, and that the first and the second optical fibers are spliced together with a rotation of 90° between the two fibers in the splice, the phase shift between the two polarizations in the first fiber being reversed in the second fiber.

19. The system according to claim 18, characterized in that the first and second optical fibers are single-polarization fibers with an extinction ratio of at least 40 db.

20. The system according to claim 18, characterized in that on the output from the sensor element the optical fiber is provided in the form of one or more delay loops.

21. The system according to claim 18, characterized in that a standard fiber is provided as output fiber from the sensor to the detection system.

22. The temperature-compensated, polarimetric, optical strain sensor for use in a strain measurement system according to claim 9, wherein the strain sensor comprises a first, double refractive, polarization-maintaining optical fiber and a second double refractive, polarization-maintaining optical fiber of the same type and length as the first fiber, wherein the first optical fiber is mechanically coupled to a measuring point which is exposed to strain, wherein the second optical fiber is provided decoupled from any mechanical strain, and wherein the first and the second optical fibers are spliced together with a rotation of 90° between the two fibers in the splice, the phase shift between the two polarizations in the first fiber being reversed in the second fiber, characterized in that the strain sensor is connected to a coupling element, the coupling element being rigidly connected via at least two mechanical attachment points in abutment with a structural part which is exposed to strains produced by the mechanical loads which have to be monitored, that a sensor element which is formed by a section of the first optical fiber, for detection of strains is provided in sensor tubes which pass through a support part of the coupling element, and that the sensor element is secured in the sensor tube in such a manner that the detached section of the sensor element provides between its securing points a measuring distance which is substantially smaller than the distance between the coupling element's attachment points on the structural part.

23. The optical strain sensor according to claim 22, characterized in that the coupling element is in the form of a yoke, the arms and crossbeams of the yoke constituting the yoke's main part, that one end of the support part is rigidly attached to the yoke's crossbeam and extends freely parallel to and between the arms of the yoke and past them to a free end, and that the yoke's crossbeam and support part are divided by an open gap which is located orthogonally on the yoke's plane and extends along the support part's longitudinal axis towards the support part's free end, and that the sensor tube passes through the support part near the end of the gap beyond the end of the yoke's arms and is located orthogonally on the support part's longitudinal axis, in such a manner that the sensor tube's longitudinal axis is located in the yoke's plane and parallel to the connecting line between the coupling element's attachment points.

24. The optical strain sensor according to claim 23, characterized in that the coupling element is mechanically rigidly connected to the structural part via two spring-tensioned anchor bolts which pass respectively through the arms of the yoke, and abut against the foundation formed by the structural part with clearance thereto via preferably conical pins of a material with low heat conducting properties provided on the arms of the yoke.

25. The optical strain sensor according to claim 23, characterized in that the end of the sensor tube is rigidly attached to the support part on each side of the gap by means of electron beam welding.

26. The optical strain sensor according to claim 22, characterized in that the sensor element is secured in the sensor tube by gluing, preferably by means of a capillary glue.

27. The optical strain sensor according to claim 22, characterized in that the temperature-compensating element formed by a section of the second optical fiber and decoupled from the mechanical strain, is provided outside the coupling element, the splice with a rotation of 90° between the first and second optical fibers being located between the sensor element and the temperature-compensating element, preferably in such a manner that the sensor element and the temperature-compensating element are symmetrically arranged in relation to each other about the splice, and that a temperature-compensating element is secured in a sensor tube of the same type as the sensor tube for the sensor element, in such a manner that the distance between the temperature-compensating element's attachment points is equal to the sensor element's measuring distance.

* * * * *